(12) United States Patent
Goto et al.

(10) Patent No.: US 6,342,176 B2
(45) Date of Patent: *Jan. 29, 2002

(54) METHODS FOR MOLDING RESIN-MOLDED ARTICLES

(75) Inventors: Atsushi Goto, Perryville, MO (US); Akio Nakano, Nagoya (JP); Tatsuo Yamada, Aichi-ken (JP); Kenichi Furuta, Gifu-ken (JP); Minoru Toda; Tetsuya Fujii, both of Aichi-ken (JP)

(73) Assignee: Toyoda Gosei Co., Ltd., Aichi-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/215,256

(22) Filed: Dec. 18, 1998

(30) Foreign Application Priority Data

Dec. 25, 1997 (JP) .............................. 9-369152
Dec. 26, 1997 (JP) .............................. 9-369160

(51) Int. Cl.$^7$ .............................................. B29C 45/14
(52) U.S. Cl. ...................... 264/255; 264/275; 264/279; 264/328.8; 264/328.12; 425/127; 425/129.1
(58) Field of Search ................................ 264/254, 275, 264/279, 328.8, 255, 250, 328.12; 425/127, 129.1, 120

(56) References Cited

U.S. PATENT DOCUMENTS 5,053,179 A * 10/1991 Masui et al. ................ 264/257
5,811,053 A * 9/1998 Ota et al. .................... 264/511

FOREIGN PATENT DOCUMENTS

| EP | 0692362 A1 | * | 1/1996 |
| JP | 52-4707 | | 4/1977 |
| JP | 63-41116 | | 2/1988 |
| JP | 2-102010 | | 4/1990 |
| JP | 02-102010 | | 4/1990 |
| JP | 09-267353 | | 10/1997 |

OTHER PUBLICATIONS

Patent Abstracts of Japan, vol. 14, No. 311 (M–0994), (JP 02 102010), Jul. 1990.*
Patent Abstracts of Japan, vol. 98, No. 2, (JP 09 267353), Jan. 1998.*

* cited by examiner

Primary Examiner—Jan H. Silbaugh
Assistant Examiner—Edmund H. Lee
(74) Attorney, Agent, or Firm—Pillsbury Winthrop LLP

(57) ABSTRACT

The object of the invention is to provide a method for molding a resin-molded article having an excellent surface appearance without any resin-intrusion part on the front surface of a skin thereof. In the invention, the skin is placed on a part of a inner wall of a mold and then injecting a synthetic resin into a cavity of the mold to effect an integral molding of a resin-molded article having the skin on a part thereof, wherein a mold having a first gate on a first inner wall part located on the part other than the back surface of the skin placed on the inner wall of said mold and a second gate on a second inner wall part which faces the back surface of the skin placed on the inner wall is employed; and wherein the synthetic resin is first injected from said first gate until the tip portion of the synthetic resin comes close to the edge of said skin, and then the synthetic resin is injected from the second gate.

10 Claims, 5 Drawing Sheets

METHODS FOR MOLDING RESIN-MOLDED ARTICLES

BACKGROUND OF THE INVENTION

1. Field of the Invention

The present invention relates to a method for molding a resin-molded article having a skin integrally molded on-a part of the surface thereof, such as an instrument panel for an automobile.

2. Description of the Related Art

While a resin-molded article made from a synthetic resin is employed as an instrument panel or a door trim for an automobile, it partially has a skin on its surface to improve the physical properties and the surface appearance.

As shown in FIG. 12, for example, a resin-molded article 9 partially having a skin on its surface consists of a resin-made part 91 which is a synthetic resin body having a skin 95 integrally molded thereto.

The skin 95 can have, for example, a vinyl chloride layer on the front surface and a polypropylene foam layer on the back surface.

The conventional resin-molded article is molded by placing a skin on a portion of the inner wall of a cavity of a mold and then injecting a synthetic resin into the cavity from a gate 8 (FIG. 12) toward the skin 95.

However, the resin-molded article 9 molded as described above may undergo intrusion of the synthetic resin 91 far onto the front surface at the edge of the skin 95 as shown in FIG. 12, thereby forming a resin-intrusion 910. As a result, the appearance of the resin-molded article 9 is adversely affected.

SUMMARY OF THE INVENTION

Therefore, the object of the present invention is to provide a method for molding a resin-molded article having an excellent surface appearance without formation of any resin-intrusion on the front surface of the skin.

In the first aspect of the present invention, the present invention provides a method for molding a resin-molded article by placing a skin on a portion of an inner wall of a mold and then injecting a synthetic resin into a cavity of the mold to effect an integral molding of a resin-molded article with the skin on a portion thereof.

The mold has a first gate on a first inner wall part located away from the back surface of the skin which has been placed on the inner wall of the molding. A second gate is located on a second inner wall and facing the back surface of the skin.

The synthetic resin is first injected from the first gate until a resin comes close to the edge of the skin, and then the synthetic resin is injected from the second gate.

A key feature of the first aspect of the invention is that the injection of the synthetic resin is performed by injecting the synthetic resin initially from the first gate until the tip portion of the synthetic resin comes close to the edge of the skin and then subsequently injecting the synthetic resin from the second gate.

The effects and the advantages of the first aspect of the present invention are discussed below.

A skin is placed on a portion of the inner wall of a mold as described above, and after mold clamping, a synthetic resin is injected from the first gate. Then the synthetic resin is continuously injected until its tip portion comes close to the edge of the skin.

Subsequently, before the tip portion of the synthetic resin from the first gate comes to the edge of the skin, the synthetic resin is injected from the second gate. Injection, this time, is performed toward a back surface of the skin. Then, the synthetic resin moves through the space between the back surface of the skin and the second inner wall of the mold toward the edge of the skin, where a top of flow of the resin from the second gate fuses with the tip portion of the synthetic resin injected from the first gate at a point near the edge of the skin.

It is important here that the synthetic resin injected from the second gate presses the skin in the direction of the inner wall of the mold since it is injected onto the back surface of the skin. As a result, the edge of the skin is also pressed in the direction of the inside of the inner wall, whereby preventing the intrusion of the synthetic resin onto the front surface of the skin.

Moreover, since the tip portion of the synthetic resin injected from the first gate goes only to the point just before the edge of the skin, the intrusion described above is also prevented. As a result, a final resin-molded article has a satisfactory surface appearance on the front surface of the skin.

In the second aspect of the present invention, the present invention provides a method for molding a resin-molded article comprising placing a skin on a part of the inner wall of a mold and then injecting a synthetic resin into a cavity of the mold to effect an integral molding of a resin-molded article having the skin on a part thereof.

The method uses a mold which has a second gate on the second inner wall part which faces the back surface of the skin which has been placed on the inner wall of the mold and a first gate on a first inner wall part located away from the back surface of the skin. The method comprises the steps of:

injecting the synthetic resin only from the second gate; and performing dwelling by pressurization from the first gate which is subsequently opened after the completion of injection of the synthetic resin from the second gate.

A key feature in the second aspect of the invention is that a mold employed only has a second gate from which a synthetic resin is injected. After completion of the injection from the second gate, a first gate is opened to effect dwelling by pressurization from the first gate.

The mold described above has a first gate and a second gate. The first gate is closed during injection of a synthetic resin.

The effect of the second aspect of the invention is discussed below.

In the second aspect of the invention, a skin is placed on a part of the inner wall of a mold as described above, and after mold clamping, a synthetic resin is injected only from the second gate. The injected synthetic resin from the second gate fills the entire cavity of the molding. As a result, the synthetic resin injected from the second gate is initially brought into contact with the back surface of the skin, and then spreads in the mold and presses against and spreads to the edges of the skin. Subsequently, the resin goes beyond the edge of the skin toward the portion of the wall which is not covered with skin.

Accordingly, no synthetic resin goes around the edge of the skin to the front surface of the skin, thereby ensuring the prevention of a peeled skin which causes a quality problem.

The injection of the synthetic resin is performed only from the second gate. Therefore, there is no need for fusion of the resin from the second gate with the synthetic resin injected from another gate, thereby ensuring the prevention of a weld which tends to form at the point of fusion.

The mold described above is provided with a first gate on the first inner wall located away from the back surface of the skin, and after completion of the injection of the synthetic resin from the second gate, the first gate is opened to effect dwelling by pressurization from the first gate.

Thus, the dwelling by which the synthetic resin is kept under pressure is performed for a period after the synthetic resin has filled the cavity. In this step, such dwelling is performed preferably utilizing the first gate described above and the pressurization by the second gate is discontinued. By such a procedure, a direct and excessive pressurization from the second gate onto the skin can be avoided, thereby reducing damage to the skin substantially. As a result, the conventional problems experienced frequently, such as a depressed skin, can be avoided.

According to the first and second aspects of the present invention, a method for molding a resin-molded article having an excellent surface appearance without forming a resin-intrusion on the front surface of the skin is provided.

DETAILED DESCRIPTION OF THIS INVENTION

Figure 1:
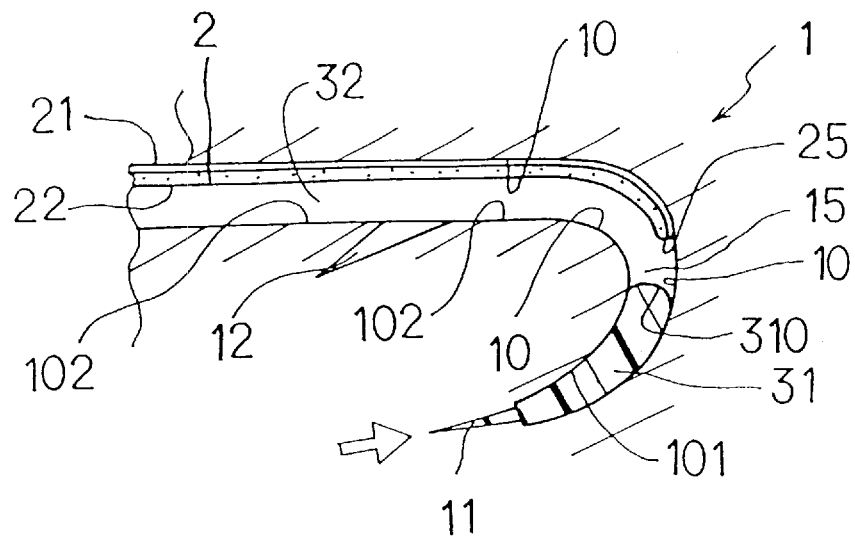
FIG. 1 is an explanatory illustration showing a method for molding a resin-molded article according to a first Embodiment of the invention.

A key feature of the first aspect of the invention is that the injection of the synthetic resin is performed by injecting the synthetic resin first from the first gate until the tip portion of the synthetic resin comes close to the edge of the skin and then injecting the synthetic resin from the second gate.

In the first aspect of the invention, the injection of the synthetic resin from the first gate is ceased preferably at the point in time when the distance between the tip portion of the resin and the edge of the skin is between 0 to 10 cm. When the distance between the tip portion of the resin and the edge of the skin is less than 0 cm, namely, when the tip portion of the synthetic resin injected goes over the edge onto the skin, a slight intrusion of the resin around the edge may be formed.

On the other hand, when the distance exceeds 10 cm, the distance between the edge of the skin and the tip portion of the resin injected from the first gate is large, and the volume of the cavity between the two is increased, which must be filled with an increased amount of the synthetic resin from the second gate. This results in a prolonged injection molding time.

This is also because of a reduced clearance between the back surface of the skin and the inner wall of the resin-molded article, which causes the synthetic resin injected from the second gate to go slowly there through. As a result, an increased amount of the synthetic resin supplied, as described above, leads to an increased time period for the total injection molding process.

In addition, fusion of the synthetic resin at a site distant from the edge of the skin may cause a more evident weld.

Preferably, a plurality of the first gates and the second gates are provided on the first inner wall part and the second inner wall part, respectively.

In such a case, the synthetic resin injected from the plural second gates exerts pressure onto the back surface of the skin at two or more pressing points. As a result, the formation of a resin-intrusion is further prevented.

In addition, the injection of the synthetic resin can be completed in a shorter period.

It is preferable to continuously perform dwelling of a molded article from the second gate after injection of the synthetic resin from the second gate.

In such a case, the synthetic resin is first injected from the first gate, and then the first gate is closed, and thereafter the injection of the synthetic resin from the second gate followed from the dwelling by the second gate. Accordingly, the skin serves to reduce the pressure and a little time period elapses until the dwelling pressure is applied to the part of the article having no skin. As a result, burr formation can be controlled.

Preferably, after injection of the synthetic resin from the second gate, the second gate is closed. Thereafter the first gate is opened to effect dwelling of the molded article.

In such a case, the synthetic resin is first injected from the first gate, and then the first gate is closed, and thereafter the synthetic resin is injected from the second gate and subsequently the second gate is closed, and finally the first gate is opened again for dwelling of the molded article.

Thus, since the injection of the synthetic resin from the second gate is followed by re-opening of the first gate for dwelling, a little time period elapses until the dwelling pressure is applied to the part of the article having no skin. As a result, burr formation can be controlled.

The first aspect of the present invention can be applied to molding of automobile components such as instrument panels, door trims, console boxes, console lids and the like.

A key feature of the second aspect of the invention is that a synthetic resin is first injected only from a second gate and after completion of the injection from the second gate, a first gate is opened to effect dwelling by pressurization from the first gate.

Preferably, the pressurization from the first gate is conducted by means of the injection pressure of the synthetic resin. Thus, preferably the synthetic resin is supplied also to the first gate and the first gate is opened to perform dwelling by means of the injection pressure of the synthetic resin. As a result, a sufficient dwelling pressure can readily be obtained while the structure of the mold can still be kept simple as conventional.

The second aspect of the present invention can be applied to molding of a resin-mold article having a skin on a part thereof, such as instrument panels and door trims for an automobile.

Embodiments

Embodiment 1

A method for molding a resin-molded article having a skin on a portion thereof according to Embodiment 1 of the first aspect of the present invention is discussed with reference to FIGS. 1 to 3.

The method for molding of Embodiment 1 employs a mold 1 having a first gate 11 on a first inner wall part 101 facing away from a back surface 22 of a skin 2 placed on a inner wall 10 of the mold 1 and a second gate 12 on a skin-facing inner wall part 102 which faces the back surface 22 of the skin 2.

Figure 2:
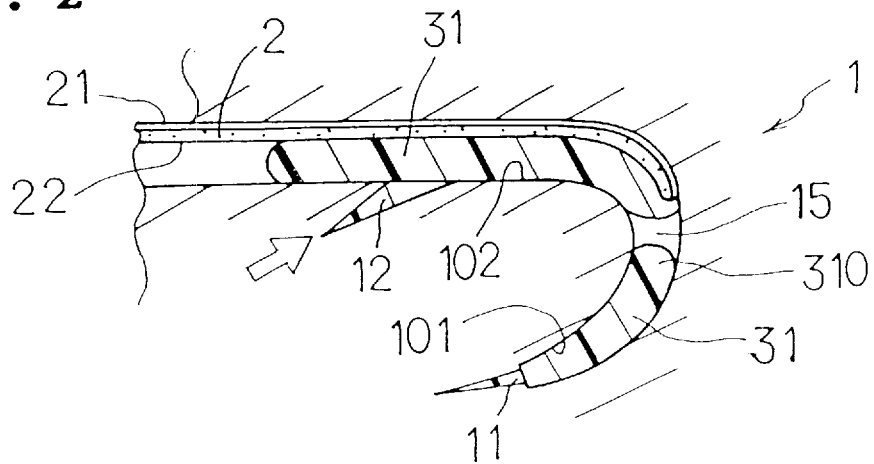
FIG. 2 is an explanatory illustration showing a later stage of the method for molding a resin-molded article of FIG. 1.

For molding, as shown in FIG. 1, a synthetic resin 31 is injected from the first gate 11 and the first gate 11 is closed when the tip portion 310 of the synthetic resin 31 comes to the point 0 to 10 cm distant from an edge 25 of the skin 2. Then, as shown in FIG. 2, the synthetic resin 31 is injected from the second gate 12 and dwelling is performed as the second gate 12 remains opened.

Figure 3:
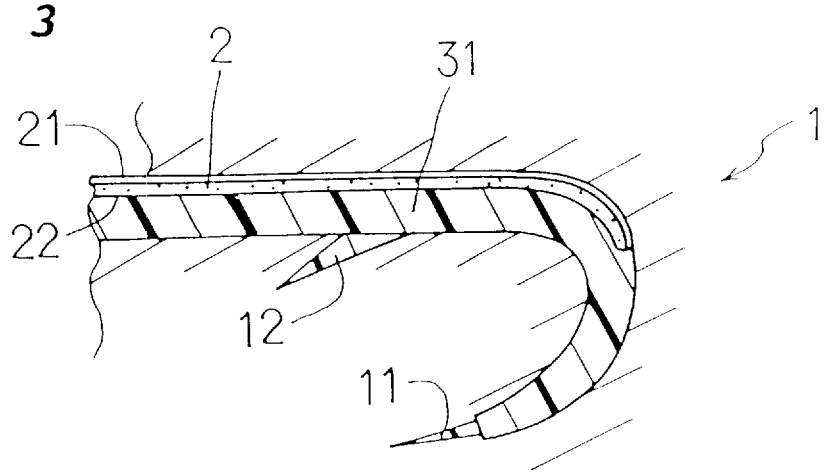
FIG. 3 is an explanatory illustration showing a later stage of the method for molding a resin-molded article of FIG. 2.

Consequently, as shown in FIG. 3, both of the synthetic resins 31 described above fuse with each other and become one, whereby obtaining a resin-molded article having the skin 2 thereon.

In this embodiment, the skin 2 is placed with its front surface 21 being in contact with the inner wall 10 of the mold 1. Such a contact can be achieved by temporary attachment using pins or vacuum adsorption using a suction device. Between the back surface 22 of the skin 2 and the second inner wall part 102, a second cavity 32 is established. Further, between the inner wall 10 of the mold 1 and the first inner wall part 101, a first cavity 15 is established.

The effect of this embodiment is discussed below.

In this embodiment, the skin 2 is placed on a part of the inner wall 10 of the mold 1, and after mold clamping, the synthetic resin 31 is injected from the first gate 11. When the tip portion 310 of the synthetic resin 31 comes to the point 0 to 10 cm distant from the edge 25 of the skin 2, the first gate 11 is closed.

Subsequently, before the tip portion 310 of the synthetic resin 31 injected from the first gate 11 comes to the edge 25 of the skin 2, the synthetic resin 31 is injected from the second gate 12. This injection is performed toward the back surface 22 of the skin 2.

The synthetic resin 31 comes through the space between the back surface 22 of the skin 2 and the second inner wall part 102 of the mold toward the edge 25 of the skin 2, and is fused with the tip portion 310 of the synthetic resin 31 injected from the first gate 11 which is located nearer than the edge 25. Then, dwelling is performed as the second gate 12 remains opened.

It is important here that the synthetic resin 31 injected from the second gate 12 is injected toward the back surface 22 of the skin 2 thereby coming through the cavity and pressing the skin 2 onto the inner wall 10 of the mold. Accordingly, the edge 25 of the skin 2 is also pressed in the direction of the inner wall 10, thereby preventing the synthetic resin 31 from going around the edge onto the front surface of the skin 2.

Moreover, since the tip portion 310 of the synthetic resin 31 injected from the first gate 11 goes only to a point near the edge 25 of the skin 2, it does not go around the edge as described above. As a result, a resin-molded article obtained also has an excellent appearance on the front surface 21 of the skin 2.

In Embodiment 1, the synthetic resin is first injected from the first gate 11, and then the first gate 11 is closed, and subsequently the synthetic resin 31 is injected from the second gate 12 and dwelling is continuously performed by the second gate 12. Thus, the skin 2 serves to reduce the pressure and a little time period elapses until the dwelling pressure is applied to the part of the article having no skin. As a result, burr formation can be controlled.

In addition, the molding can be performed at a pressure lower than that employed in an ordinary injection molding process.

Embodiment 2

Figure 4:
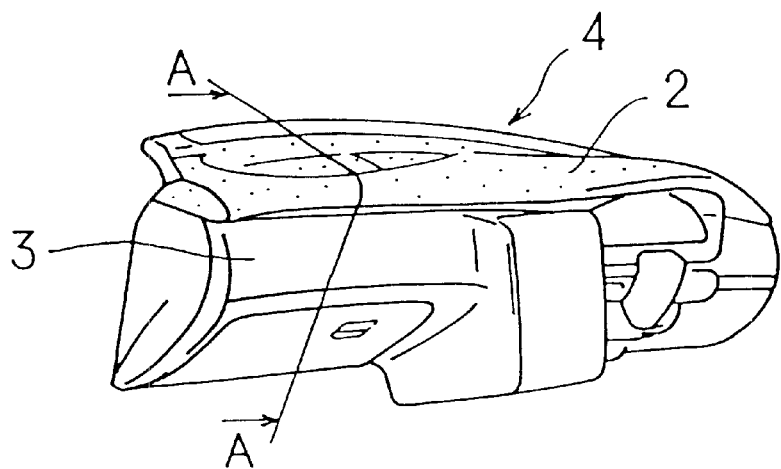
FIG. 4 is an explanatory illustration showing instrument panels according to Embodiments 2 and 6.
Figure 5:
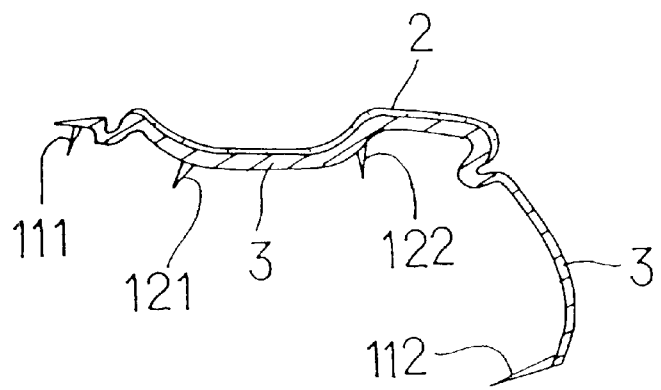
FIG. 5 is a perspective view of FIG. 4, taken along the A—A line.
Figure 6:
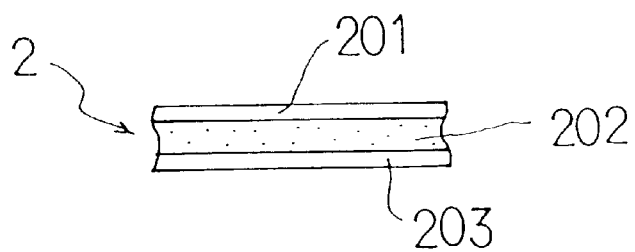
FIG. 6 is an explanatory illustration showing a skin according to the second and sixth Embodiments of the invention.

Embodiment 2 is an example of an application of the first aspect of the invention to an instrument panel 4 of an automobile as shown in FIGS. 4 to 6.

The instrument panel 4 comprises a resin part 3 entirely formed from a synthetic resin and a skin 2 on the top surface of the instrument panel as shown in FIGS. 4 and 5.

In Embodiment 2, plural first gates 111 and 112 and plural second gates 121 and 122 are employed as shown in FIG. 5. The skin employed is a three-layered skin consisting of a top layer 201 made from vinyl chloride, an inner layer 202 made from polypropylene foam, and a substrate 203 made from polypropylene resin, as shown in FIG. 6. The synthetic resin for the resin part 3 is polypropylene.

In order to mold the instrument panel 4, the skin 2 is provided on a part of the inner wall of the mold similarly as in Embodiment 1, and the synthetic resin is injected sequentially from the plural first gates 111 and 112, and the second gates 121 and 122 similarly as in Embodiment 1.

In Embodiment 2, the injection of the synthetic resin from the first gate was discontinued when the tip portion 310 of the synthetic resin reached a point 2 cm from the edge of the skin 2, and subsequently the second gate was opened. Dwelling by the second gate was performed for 15 to 20 seconds.

The production of the instrument panel of Embodiment 2 is performed by the same method as described in Embodiment 1.

According to Embodiment 2, an instrument panel having an excellent surface appearance with no resin-intrusion on the front surface of the skin 2 can be obtained.

Embodiment 3

Figure 7:
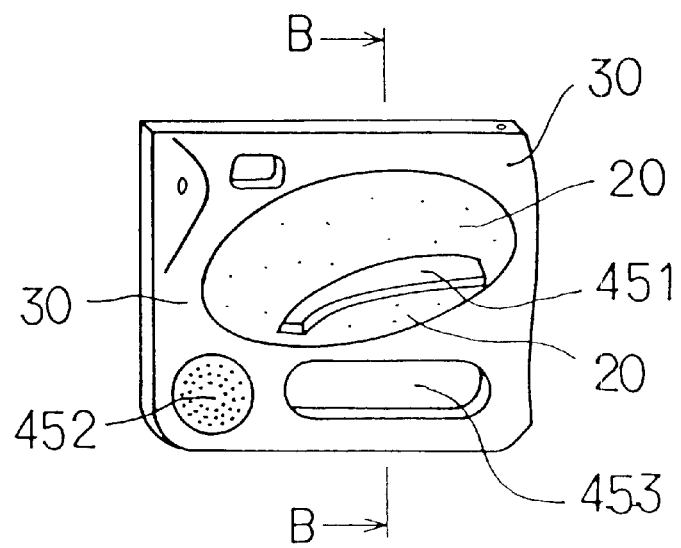
FIG. 7 is an explanatory illustration showing a door trim according to the third and seventh Embodiments of the invention.
Figure 8:
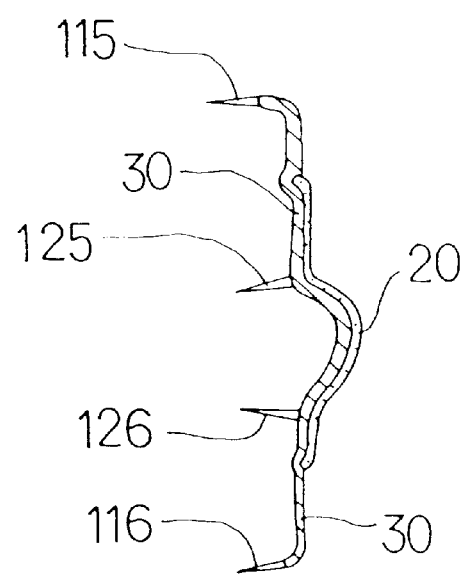
FIG. 8 is a perspective view of FIG. 7, taken along the line B—B.

Embodiment 3 is an example of an application of the first aspect of the invention to a door trim of an automobile as shown in FIGS. 7 and 8.

The door trim has a resin part 30 formed entirely from a synthetic resin with a skin 20, as shown in the both figures. In these figures, an arm rest 451, a speaker box 452 and a pocket 453 are also shown.

As the skin 20, a fabric backed with a polypropylene sheet on its back surface is used. Polypropylene is used as the synthetic resin.

Plural first gates 115 and 116, and plural second gates 125 and 126 are employed.

The production of the instrument panel of Embodiment 3 is performed by the same method as described in Embodiment 1.

According to this embodiment, an instrument panel (a door trim) having an excellent surface appearance with no resin-intrusion on the front surface of the skin 20 can be obtained.

Embodiment 4

In this embodiment, a synthetic resin 31 is first injected from a first gate 11 and then the first gate 11 is closed when a tip portion 310 of the synthetic resin 31 reaches a point 0 to 10 cm from an edge 25 of a skin 2, and subsequently the synthetic resin 31 is injected from a second gate 12, to fill the mold with the required synthetic resin for a molded article. Then the second gate 12 is closed and finally the first gate 11 is reopened to perform dwelling thereof (see FIGS. 1 to 3).

The production of the instrument panel of Embodiment 4 is performed by the same method as described in Embodiment 1.

In this method, the synthetic resin is first injected from the first gate and subsequently the first gate is closed, and then the synthetic resin is injected from the second gate 12 and subsequently the second gate 12 is closed, and finally the first gate 11 is reopened to perform dwelling thereof.

Namely, since the dwelling is performed by reopening the first gate 11 after injection of the synthetic resin from the second gate 12, a little time period elapses until the dwelling pressure is applied to the part of the article having no skin. As a result, burr formation can be controlled.

Further, since the dwelling is performed by the first gate 11 which faces away from the skin, the dwelling pressure is not directly applied against the skin 2 for along time period. Accordingly, concentrated pressurization on a specific part of the skin 2 can be eliminated, thereby preventing the skin 2 from being damaged.

The other effects according to Embodiment 4 are the same as those of Embodiment 1.

Embodiment 5

A method for molding a resin-molded article partially having a skin of the second aspect of this invention is described with reference to FIGS. 9 to 11.

Figure 9:
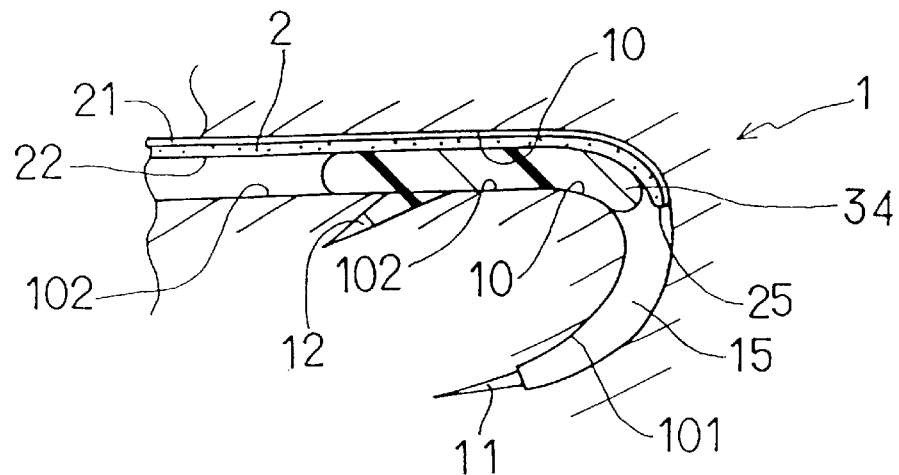
FIG. 9 is an explanatory illustration showing a method for molding a resin-molded article according to the fifth Embodiment of the invention.
Figure 10:
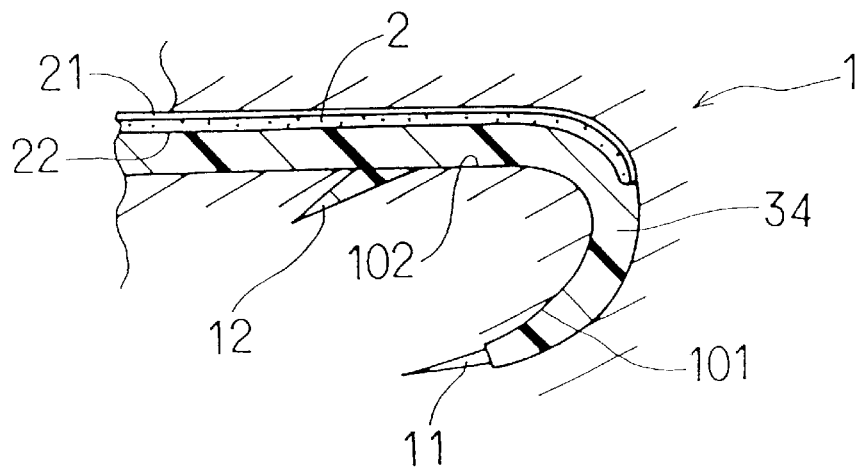
FIG. 10 is an explanatory illustration showing a later stage of the method for molding a resin-molded article of FIG. 9.
Figure 11:
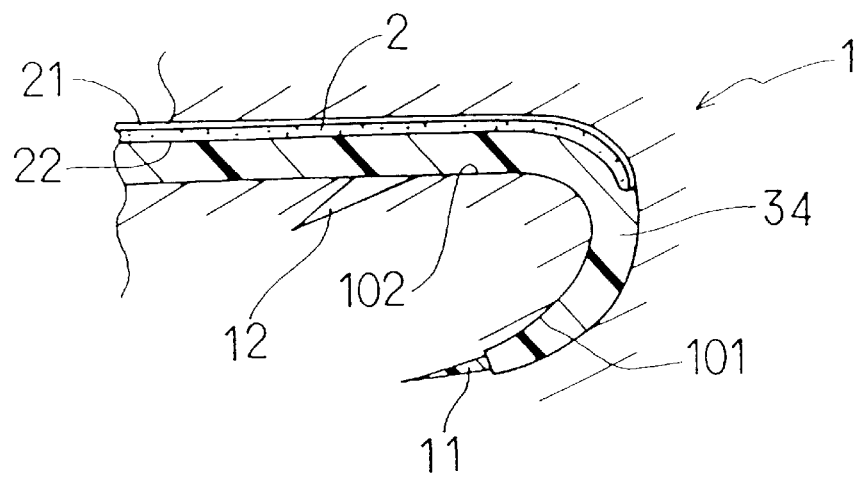
FIG. 11 is an explanatory illustration showing a later stage of the method for molding a resin-molded article of FIG. 10.
Figure 12:
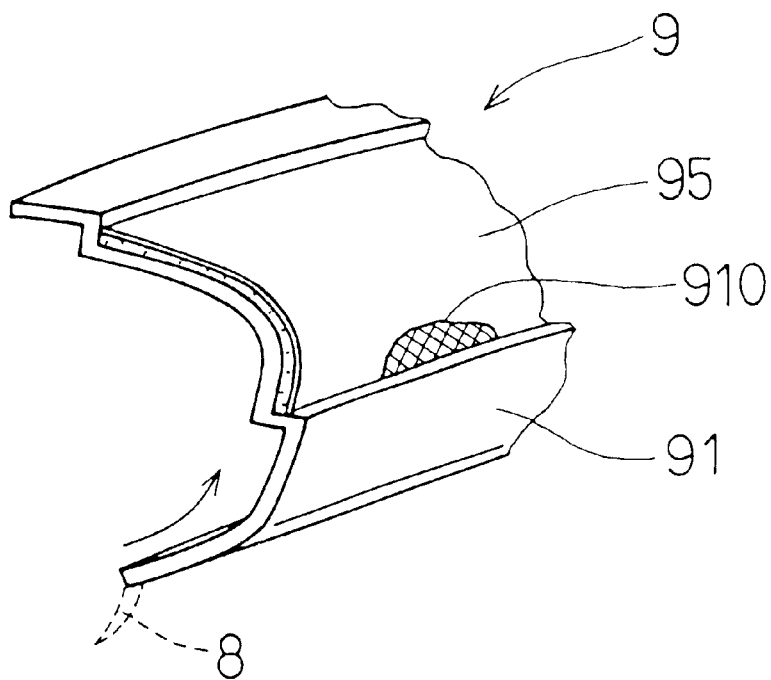
FIG. 12 is an explanatory illustration showing problems of a resin-molded article in the conventional method.

The method for molding according to Embodiment 5, which is illustrated in FIGS. 9 to 11, employs a mold 1 provided with a second gate 12 on a skin-facing inner wall part 102 located near a back surface 22 of a skin 2. The skin 2 is placed on an inner wall 10 of the mold 1. Also in the mold 1, the first gate 11 is provided on the first inner wall part 101 located away from the back surface 22 of the skin 2.

During molding, a synthetic resin 34 is injected only from the second gate 12 as shown in FIG. 9. After completion of the injection of the synthetic resin 34 from the second gate 12 as shown in FIG. 10, the first gate 11 is opened to effect dwelling by pressurization by the first gate 11 as shown in FIG. 11. This pressurization by the first gate is effected by means of the injection pressure of the synthetic resin 34 as shown in FIG. 11. As a result, a resin-molded article having the skin 2 on a part thereof can be obtained.

In Embodiment 5, the skin 2 is placed with its front surface 21 being in contact the with the inner wall 10 of the mold. This can be achieved by means of conventional placing methods such as vacuum adsorption or retention by pins.

The effect of this embodiment is discussed below.

In Embodiment 5, the skin 2 is placed on a part of the inner wall of the mold 1, and after mold clamping, the synthetic resin 34 is injected from the second gate 12 only until it fills the cavity 15 of the mold 1 entirely.

As a result, the synthetic resin 34 injected from the second gate 12 contacts the back surface 22 of the skin 2 first and thereafter spreads to both sides while pressing the skin 2 onto the mold 10. Then it moves along the back surface 22 of the skin and then goes beyond the edge 25 toward the part having no skin.

Accordingly, the synthetic resin is prevented from going around the edge 25 of the skin 2 onto the front surface 21, thereby ensuring the prevention of a peeled skin which causes a quality problem.

The injection of the synthetic resin 34 is performed only from the second gate 12. Therefore, there is no need of fusion with the synthetic resin injected from another gate. This insures the prevention of a weld which tends to be formed at the point of fusion.

Also in Embodiment 5, the first gate 11 is provided as described above, and after completion of the injection of the synthetic resin 34 from the second gate 12, the first gate 11 is opened and dwelling is performed by pressurization by the first gate 11. Thus, when dwelling is conducted after filling the cavity 15 with the synthetic resin 34, the pressurization by the first gate 11 is employed but the pressurization by the second gate 12 is discontinued.

As a result, direct and excessive pressurization from the second gate 12 onto the skin 2 can be eliminated, thereby reducing damage to the skin 2 substantially. Therefore, the conventional problems experienced frequently, such as a depressed skin, can be avoided.

As described above, the pressurization by the first gate 11 is performed by means of the injection pressure of the synthetic resin 34. As a result, a sufficient dwelling pressure can readily be obtained while the structure of the mold can still be kept simple as conventional.

Embodiment 6

Embodiment 6 is an example of an application of the second aspect of the invention to an instrument panel 4 of an automobile as shown in FIGS. 4 to 6.

In order to mold the instrument panel 4 described above, the skin 2 is provided on a part of the inner wall of the mold similarly as in Embodiment 5, and the synthetic resin is injected only from plural first gates 121 and 122. After filling the cavity of the mold with the synthetic resin, the second gates 121 and 122 are closed and the first gates 111 and 112 are opened for dwelling. The production of the instrument panel of Embodiment 6 is performed by the same method as described in Embodiment 2 or 5.

According to Embodiment 6, the instrument panel 4 having an excellent surface appearance without any resin-intrusion part on the front surface of the skin 2 can be obtained.

Embodiment 7

Embodiment 7 is an example of application of the second aspect of this invention to a door trim of an automobile as shown in FIGS. 7 and 8.

For the skin 20, a fabric with a polypropylene sheet on its back surface is used, and polypropylene is used as the synthetic resin.

Plural first gates 115 and 116, and plural second gates 125 and 126 are used as the first gate and the second gate.

The other features of this embodiment are the same as those in Embodiments 3 and 6.

According to this embodiment, an instrument panel having an excellent surface appearance with no resin-intrusion on the front surface of the skin 20 can be obtained.

This application incorporates herein by reference foreign priority documents Japanese Patent Application 369152/1997 and Japanese Patent Application 369160/1997 in their entirety.

What is claimed is:

1. A method of molding a resin-molded article with a skin on a portion thereof comprising:

placing said skin on a portion of an inner wall of a mold, said skin having a back surface and a front surface and comprising a foam layer, said front surface of said skin contacting said inner wall of said mold;

injecting a synthetic resin from a first gate into said mold at a location such that said synthetic resin injected from said first gate is not in contact with said skin;

closing said first gate, after said synthetic resin is injected from said first gate, before a tip portion of said synthetic resin reaches an edge of said skin so that said synthetic resin does not reach said edge of said skin; and injecting said synthetic resin from a second gate to fill a cavity of said mold after said step of closing said first gate, wherein said second gate faces said back surface of said skin so that said synthetic resin injected from said second gate presses against said back surface of said skin in the direction of said inner wall and a tip portion of injected resin from said second gate meets and fuses with the tip portion of said synthetic resin injected from said first gate.

2. The method of claim 1, wherein said synthetic resin is a polypropylene resin.

3. The method of claim 1, wherein a layer consisting of said back surface of said skin is a polypropylene sheet.

4. The method of molding of claim 1, wherein the injection of said synthetic resin from said first gate is ceased when a distance between the tip portion of the resin and the edge of the skin is between 0 to 10 cm.

5. The method of claim 1, wherein said mold comprises a plurality of first gates on a first inner wall part and a plurality of second gates on a second inner wall part.

6. The method of claim 1, wherein said skin has three-layers consisting of a vinyl chloride top layer, a polypropylene foam inner layer and a polypropylene resin bottom layer.

7. The method of claim 1, wherein after completion of filling of the cavity with the synthetic resin, performing dwelling by the first gate.

8. The method of claim 7, wherein said dwelling is performed continuously after injection of the synthetic resin from the second gate.

9. The method of claim 1, wherein after the synthetic resin is injected from the second gate, closing the second gate and then opening the first gate for dwelling of the molded article.

10. A method for molding a resin-molded article having a skin on a portion thereof comprising:

placing said skin on a portion of an inner wall of a mold, said skin having a back surface and a front surface, said front surface of the skin facing said inner wall of said mold; wherein said mold has a second gate on a second inner wall part facing said back surface of said skin, and a first gate on a first inner wall part facing away from the back surface of the skin;

injecting a synthetic resin into a cavity of the mold only from said second gate, wherein said synthetic resin injected from said second gate initially comes into contact with the back surface of the skin, and then spreads through the mold while pressing against the skin;

closing said second gate after the synthetic resin spreads beyond an edge of the skin and the cavity is filled entirely with the synthetic resin;

performing dwelling by pressurization by the first gate by opening said first gate after completion of the injecting of the synthetic resin from said second gate, wherein said pressurization is conducted by injection pressure of the synthetic resin; and effecting an integral molding of said resin-molded article having the skin on a portion thereof.

* * * * *